US007711482B2

(12) United States Patent
Coatantiec et al.

(10) Patent No.: US 7,711,482 B2
(45) Date of Patent: May 4, 2010

(54) HYBRID INS/GNSS SYSTEM WITH INTEGRITY MONITORING AND METHOD FOR INTEGRITY MONITORING

(75) Inventors: Jacques Coatantiec, Fauconnieres (FR); Nicolas Martin, Bourg-les-Valence (FR)

(73) Assignee: Thales (FR)

( * ) Notice: Subject to any disclaimer, the term of this patent is extended or adjusted under 35 U.S.C. 154(b) by 0 days.

(21) Appl. No.: 12/443,886

(22) PCT Filed: Sep. 25, 2007

(86) PCT No.: PCT/EP2007/060139

§ 371 (c)(1),
(2), (4) Date: Apr. 1, 2009

(87) PCT Pub. No.: WO2008/040658

PCT Pub. Date: Apr. 10, 2008

(65) Prior Publication Data

US 2010/0026567 A1    Feb. 4, 2010

(30) Foreign Application Priority Data

Oct. 6, 2006    (FR) ................... 06 08792

(51) Int. Cl.
*H04B 7/19* (2006.01)
*G01S 5/14* (2006.01)

(52) U.S. Cl. .................. 701/216; 342/357.14
(58) Field of Classification Search ........... 701/216; 342/357.14
See application file for complete search history.

(56) References Cited

U.S. PATENT DOCUMENTS 5,760,737  A  *  6/1998  Brenner ............... 342/357.02
6,205,400  B1 *  3/2001  Lin ....................... 701/214
6,417,802  B1 *  7/2002  Diesel .................. 342/357.14
6,427,122  B1 *  7/2002  Lin ....................... 701/214
6,449,559  B2 *  9/2002  Lin ....................... 701/216
6,516,272  B2 *  2/2003  Lin ....................... 701/214
6,639,549  B2 * 10/2003  Vanderwerf et al. ... 342/357.02
6,982,669  B2 *  1/2006  Coatantiec et al. ..... 342/357.14
7,219,013  B1 *  5/2007  Young et al. ............ 701/214

(Continued)

FOREIGN PATENT DOCUMENTS

FR    2866423  A1    8/2005

OTHER PUBLICATIONS

Call C et al: "Performance of Honeywell's Intertial/GPS Hybrid (High) for RNP Operations" Position, Location, and Navigation Symposium, 2006 IEEE/ION Coronado, CA Apr. 25-27, 2006, Piscataway, NJ, USA, IEEE, (Apr. 25, 2006) p. 244, XP010924866; ISBN: 0-7803-9454-2.

(Continued)

*Primary Examiner*—Thomas G Black
*Assistant Examiner*—Shelley Chen
(74) *Attorney, Agent, or Firm*—Lowe Hauptman Ham & Berner, LLP (57) ABSTRACT

The invention pertains to the monitoring of the integrity of position and speed information arising from a hybridization between an inertial reference system and a satellite-based positioning receiver. The invention relates more precisely to a navigation apparatus known in the art by the name INS/GNSS system (for "Inertial Navigation System" and "Global Navigation Satellite System") hybridized in closed loop.

7 Claims, 3 Drawing Sheets

U.S. PATENT DOCUMENTS

| | | |
|---|---|---|
| 7,409,289 B2 | 8/2008 | Coatantiec et al. |
| 2002/0109628 A1* | 8/2002 | Diesel .................. 342/357.14 |
| 2002/0198656 A1* | 12/2002 | Ford et al. .................. 701/213 |
| 2003/0117317 A1* | 6/2003 | Vanderwerf et al. .... 342/357.02 |
| 2003/0149528 A1* | 8/2003 | Lin ............................ 701/214 |
| 2004/0239560 A1* | 12/2004 | Coatantiec et al. ..... 342/357.14 |
| 2006/0100781 A1* | 5/2006 | Lin et al. ................... 701/216 |
| 2007/0265810 A1 | 11/2007 | Martin et al. |
| 2008/0284643 A1* | 11/2008 | Scherzinger et al. ... 342/357.02 |

OTHER PUBLICATIONS

Brenner M: "Integrated GPS/Inertial Fault Detection Availability" Navigation, Institute of Navigation, Washington, DC, US, vol. 43, No. 2, 1996, pp. 111-130, ZXP002433665; ISSN: 0028-1522.

* cited by examiner

HYBRID INS/GNSS SYSTEM WITH INTEGRITY MONITORING AND METHOD FOR INTEGRITY MONITORING

CROSS-REFERENCE TO RELATED APPLICATIONS

The present Application is based on International Application No. PCT/EP2007/060139, filed on Sep. 25, 2007, which in turn corresponds to French Application No. 0608792 filed on Oct. 6, 2006, and priority is hereby claimed under 35 USC §119 based on these applications. Each of these applications are hereby incorporated by reference in their entirety into the present application.

FIELD OF THE INVENTION

The invention relates to the monitoring of the integrity of position and speed information arising from a hybridization between an inertial reference system and a satellite-based positioning receiver. The invention relates more precisely to a navigation apparatus known in the art by the name INS/GNSS system (for "Inertial Navigation System" and "Global Navigation Satellite System") hybridized in closed loop.

BACKGROUND OF THE INVENTION

An inertial reference system includes a set of inertial sensors (gyrometric sensors and accelerometric sensors) associated with processing electronics. A calculation platform, called a virtual platform PFV, then delivers the carrier speed and position information in a precise frame of reference (often denoted LGT, Local Geographic Trihedron). The virtual platform PFV allows the projection and the integration of the data arising from the inertial sensors. The inertial reference system provides information which is precise in the short term but which drifts over the long term (under the influence of the sensor defects). The control of the sensor defects represents a very significant proportion of the cost of the inertial reference system.

A satellite-based positioning receiver provides carrier position and speed information by triangulation on the basis of the signals transmitted by non-geostationary satellites visible from the carrier. The information provided may be momentarily unavailable since the receiver must have direct sight of a minimum of four satellites of the positioning system in order to be able to get location data. The information is furthermore of variable precision, dependent on the geometry of the constellation on which the triangulation is based, and noisy since it relies on the reception of signals of very low levels originating from distant satellites having a low transmission power. But they do not suffer from long-term drift, the positions of the non-geostationary satellites in their orbits being known precisely over the long term. The noise and the errors may be linked to the satellite systems, to the receiver or to the propagation of the signal between the satellite transmitter and the GNSS signals receiver. Furthermore, the satellite data may be erroneous as a consequence of faults affecting the satellites. These non-intact data must then be tagged so as not to falsify the position arising from the GNSS receiver.

To forestall satellite faults and ensure the integrity of the GNSS measurements, it is known to equip a satellite-based positioning receiver with a precision and availability estimation system termed RAIM (for "Receiver Autonomous Integrity Monitoring") which is based on the geometry and the redundancy of the constellation of satellites used during the triangulation and on the short-term forecastable evolution of this geometry deduced from the knowledge of the trajectories of the satellites. However, the RAIM algorithm, linked purely to the satellite based locating system, is not applicable to the monitoring of location data arising from a hybrid (INS/GNSS) system and can detect only certain types of faults in a given time.

Hybridization consists in mathematically combining the position and speed information provided by the inertial reference system and the measurements provided by the satellite-based positioning receiver to obtain position and speed information taking advantage of both systems. Thus, the precision of the measurements provided by the GNSS system makes it possible to control the inertial drift and the not very noisy inertial measurements make it possible to filter the noise in the measurements of the GNSS receiver. This combination very often calls upon the Kalman filtering technique.

Kalman filtering relies on the possibilities of modeling the evolution of the state of a physical system considered in its environment, by means of an equation termed "the evolution equation" (a priori estimation), and of modeling the dependence relation existing between the states of the physical system considered and the measurements of an external sensor, by means of an equation termed "the observation equation" so as to allow readjustment of the states of the filter (a posteriori estimation). In a Kalman filter, the effective measurement or "measurement vector" makes it possible to produce an a posteriori estimate of the state of the system, which estimate is optimal in the sense that it minimizes the covariance of the error made in this estimation. The estimator part of the filter generates a posteriori estimates of the state vector of the system by using the noted deviation between the effective measurement vector and its a priori prediction so as to generate a corrective term, called an innovation. This innovation, after multiplication by a gain vector of the Kalman filter, is applied to the a priori estimate of the system state vector and leads to the obtaining of the a posteriori optimal estimate.

In the case of a hybridized INS/GNSS system, the Kalman filter receives the position and speed data provided by the inertial reference system and the positioning measurements provided by the satellite-based positioning receiver, models the evolution of the errors of the inertial reference system and delivers the a posteriori estimate of these errors which serves to correct the inertial reference system's positioning and speed data.

The estimation of the position and speed errors due to the defects of the inertial sensors appearing at the output of the virtual platform PFV of the inertial reference system is carried out by the Kalman filter. The correction of the errors by way of their estimation made by the Kalman filter can then be done at the input of the virtual platform PFV (closed-loop architecture) or at output (open-loop architecture).

When the defects of the sensors of the inertial reference system, gyrometers, accelerometers, and barometric module (one speaks in this case of a baro-inertial reference system), are not too significant, it is not necessary to apply the corrections at the input of the virtual platform PFV; the modeling of the system (linearization of the equations governing the evolution of the system), within the filter remains valid. The a posteriori estimate of the errors of the inertial reference system which is calculated in the Kalman filter is used solely for the formulation of optimal estimates of the position and speed of the carrier by deducting from the position and speed information provided by the inertial reference system its respective estimates calculated by the Kalman filter. The hybridization is then termed open loop, and in this case, the hybridization has no influence on the calculations carried out by the virtual platform PFV.

When the inertial defects are too significant or when the duration of the flight is long, the linearization of the equations governing the evolution of the inertial model integrated within the Kalman filter is no longer valid. It is therefore obligatory to apply the corrections to the virtual platform PFV so as to remain in the linear domain. The a posteriori estimate of the errors of the baro-inertial reference system which is calculated in the Kalman filter serves not only for the formulation of the optimal estimate of the position and speed of the carrier but also for the readjustment of the inertial reference system within the virtual platform PFV. The hybridization is then termed "closed loop" and the results of the hybridization filter are employed by the virtual platform to carry out its calculations.

The hybridization can also be done by observing GNSS information of different kinds. Either the carrier's position and speed, resolved by the GNSS receiver, are considered: one then speaks of loose hybridization or hybridization in geographical axes, or the information extracted upstream by the GNSS receiver is considered, namely the pseudo-distances and pseudo-speeds (quantities arising directly from the measurement of the propagation time and the Doppler effect of the signals transmitted by the satellites towards the receiver): one then speaks of tight hybridization or hybridization in satellite axes.

With a closed-loop INS/GNSS system where the location resolved by the GNSS receiver is used to readjust the information originating from the inertial reference system, it is necessary to pay particular attention to the defects affecting the information provided by the satellites since the receiver which receives them will propagate these defects to the inertial reference system, giving rise to poor readjustment of said inertial reference system. The problem arises in a particularly critical manner for ensuring the integrity of an INS/GPS hybrid location data. In what follows, we are concerned with systems integrating tight hybridization, in closed loop.

To quantify the integrity of a position measurement in applications such as aeronautical applications, where integrity is critical, a parameter called the "protection radius" of the position measurement is used. The protection radius corresponds to a maximum position error for a given probability of occurrence of error. That is to say, the probability that the position error exceeds the announced protection radius without an alarm being dispatched to a navigation system, is less than this given probability value. The calculation is based on two types of error which are on the one hand the normal measurement errors and on the other hand the errors caused by an operating anomaly of the constellation of satellites, i.e. for example a satellite fault.

The value of the protection radius of a positioning system is a key value specified by buyers wishing to purchase a positioning system. The evaluation of the value of the protection radius generally results from probability calculations using the statistical characteristics of precision of the GNSS measurements and of the behavior of the inertial sensors. These calculations are made explicit in a formal manner and allow simulations for all the cases of a GNSS constellation, for all the possible positions of the positioning system over the terrestrial globe and for all possible trajectories followed by the positioning system. The results of these simulations make it possible to provide the buyer with protection radius characteristics guaranteed by the proposed positioning system. Usually these characteristics are expressed in the form of a value of the protection radius for an availability of 100% or of a duration of unavailability for a required value of the protection radius.

SUMMARY OF THE INVENTION

In one aspect of the present invention remedies the drawbacks of the known solutions presented above and to improve the precision of the position measurement by using hybrid corrections delivered by a Kalman filter receiving signals from all the tracked visible satellites.

In another aspect of the invention a formal expression allows the calculation of the value of the protection radius, anywhere for any trajectory and at any instant whatever.

The present invention is directed to a hybrid INS/GNSS system with integrity monitoring. A barometric module BARO, delivers measurements of barometric altitude MBA. A inertial measurement unit UMI, delivers angle increments $\Delta\theta$ and speed increments $\Delta V$. A virtual platform PFV, receives the angle increments $\Delta\theta$, the speed increments $\Delta V$, and produces inertial positioning and speed data PPVI constituting respectively a hybrid position and a hybrid speed. A satellite-based positioning receiver GNSS, operates on the basis of a constellation of N tracked visible satellites, and produces raw measurements, $MB_i$ of the signals transmitted by these satellites, i denoting a satellite index and lying between 1 and N. A Kalman hybridization filter MKF, receives the inertial positioning and speed data PPVI, the measurements of barometric altitude MBA, and the raw measurements $MB_i$ of the signals transmitted by the N satellites. The filter delivers: A hybrid correction HYC comprising an estimation of a state vector VE corresponding to the errors of the hybrid system and obtained by observing the deviations between the inertial positioning and speed data PPVI and the raw measurements $MB_i$, and variance/covariance matrix, MHYP of the error made in the estimation of the state vector VE. A bank of N secondary filters $KSF_i$, each receives the inertial positioning and speed data PPVI, the measurements of barometric altitude MBA, and the raw measurements $MB_i$ of the signals transmitted by the tracked satellites except the satellite of index i. The secondary filters $KSF_i$ delivers hybrid parameters $SHYP_i$.

The hybrid parameters $SHYP_i$ include an estimation of a state vector, $EVE_i$ corresponding to the errors of the hybrid system, calculated by observing deviations between the inertial positioning and speed data PPVI and the raw measurements of the signals transmitted by the tracked satellites except the satellite i $SPP_i$, and a secondary variance/covariance matrix $P_i$ of the error made in the estimation of the state vector $EVE_i$; A calculation module CAL, receives the hybrid parameters $SHYP_i$ and the variance/covariance matrix, MHYP. The calculation module CAL, determines a horizontal protection radius $R_T$ associated with the hybrid position, and, when components of the estimation of the state vector $EVE_i$ relating to the position are greater than a detection threshold $TH_i$, triggers an alarm upon a failure of a secondary filter $KSF_i$, and optionally identifying a failed satellite from among the N tracked visible satellites. The secondary filters $KSF_i$ and the virtual platform PFV furthermore receive the hybrid correction HYC.

The invention is also directed to a method for determining a horizontal protection radius $RP_T$ for monitoring integrity of hybrid positions delivered by a virtual platform PFV, of a hybrid INS/GNSS system as defined above, said method.

The method includes the steps of determining an auxiliary horizontal protection radius $KP_{H1}$, under an hypothesis termed $H_1$, that one of the raw measurements, $MB_i$ is erroneous, determining an auxiliary horizontal protection radius $RP_{H0}$, under an hypothesis termed $H_0$, that none of the raw measurements, $MB_i$ is erroneous, and fixing the value of the horizontal protection radius $RP_T$ as a maximum of the horizontal auxiliary protection radii $RP_{H0}$ and $RP_{H1}$.

The determination of the auxiliary horizontal protection radii $RP_{H0}$ and $RP_{H1}$ is based on determining a radius of a circle enveloping, in a horizontal plane, a confidence ellipse determined on the basis of a variance/covariance matrix and of a sought-after probability value.

Still other object and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Across the figures, the same elements are tagged by the same references.

Figure 1:
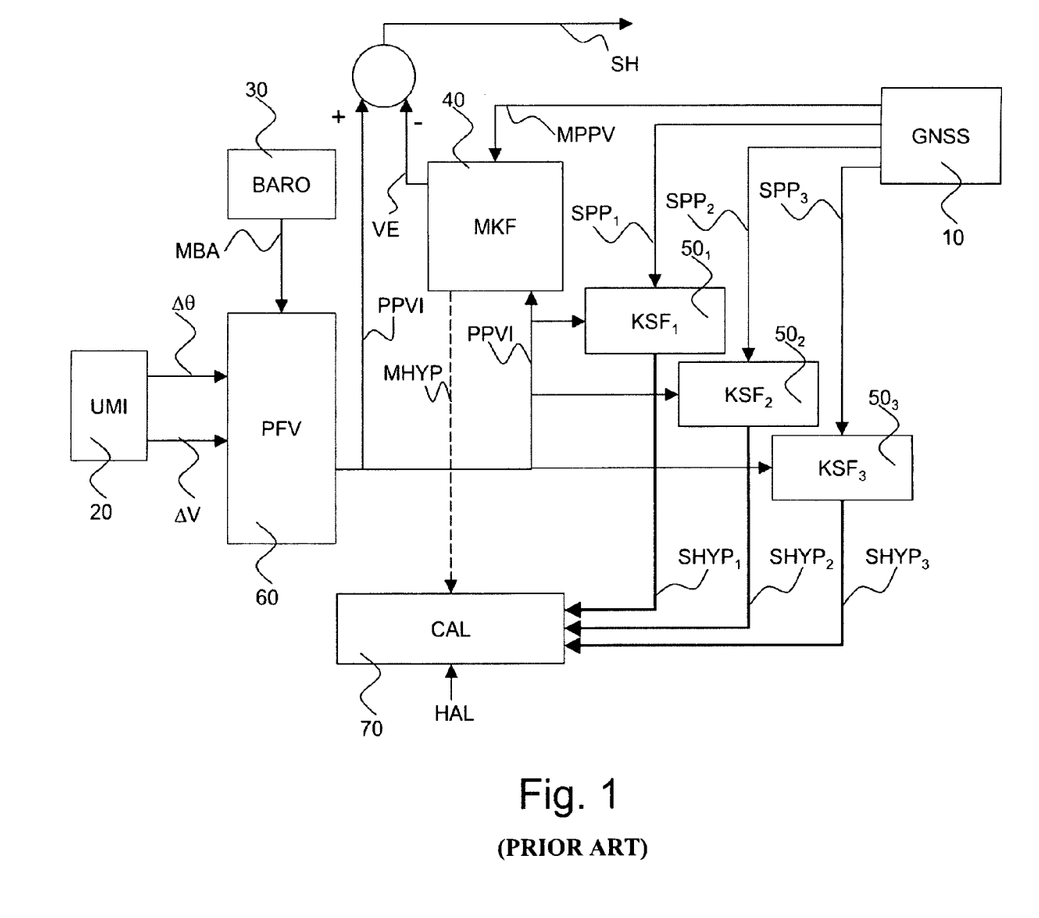
FIG. 1 schematically represents a hybrid system, closed loop and tight hybridization, according to the state of the art.

FIG. 1 represents a hybrid system according to the prior art. The hybrid system, comprises;
- a satellite-based positioning receiver, GNSS, 10, receiving signals from a constellation of N tracked visible satellites;
- an inertial measurement unit UMI, 20 delivering angle increments $\Delta\theta$ and speed increments $\Delta V$;
- a barometric module BARO, 30, delivering measurements of barometric altitude MBA;
- a Kalman hybridization filter, MKF 40;
- a bank of N secondary filters, $KSF_i$ 50i,
- a virtual platform, PFV, 60 receiving the angle increments $\Delta\theta$ and the speed increments $\Delta V$;
- a calculation module CAL, 70.

The inertial measurement unit, UMI comprises gyrometers and accelerometers (not represented): the angle increments $\Delta\theta$ are delivered by the gyrometers and the speed increments $\Delta V$ are delivered by the accelerometers.

The virtual platform, PFV receives the measurements of barometric altitude, MBA. The virtual platform, PFV produces inertial positioning and speed data, PPVI constituting respectively a hybrid position and a hybrid speed. The barometric altitude measurements are employed by the platform PFV to avoid a drift of the hybrid position along a vertical axis.

The satellite-based positioning receiver, GNSS delivers raw measurements, $MB_i$ of signals transmitted by the satellites, i denoting a satellite index and lying between 1 and N.

The Kalman hybridization filter, MKF receives a set of N raw measurements, $MB_i$. This set of N raw measurements is denoted MPPV.

The secondary Kalman filter $KSF_i$ receives the raw measurements $MB_i$ of N−1 signals. The N−1 signals are produced by the tracked satellites except the satellite of index i. This set of raw measurements $MB_i$ of N−1 signals is denoted $SPP_i$ The hybridization filter MKF and the secondary filters $KSF_i$ and receive the inertial positioning and speed data PPVI.

The hybridization filter MKF seeks to estimate the errors made in the inertial positions PPVI, it produces:
- a state vector VE corresponding to the errors of the hybrid system, obtained by observing the deviations between the inertial positioning and speed data PPVI and the corresponding raw measurements $MB_i$;
- a variance/covariance matrix, MHYP of the error made in the estimation of the state vector VE.

The secondary filters $KSF_i$ produce hybrid parameters $SHYP_i$ which comprise:
- an estimation of a state vector, $EVE_i$ corresponding to the errors of the hybrid system observing deviations between the inertial positioning and speed data PPVI and the set of raw measurements $SPP_i$ and,
- a secondary variance/covariance matrix $P_i$ of the error made in the estimation of the state vector $EVE_i$.

The hybrid system delivers a hybrid output SH composed of a difference between the inertial positions PPVI and the state vector VE.

The calculation module CAL receives the hybrid parameters $SHYP_i$ and the variance/covariance matrix, MHYP and determines a protection radius value $RP_T$.

As already mentioned, a protection radius is a very significant measurement in certain applications where it is indispensable to ensure the integrity of the data. It is recalled that the protection radius RP of a measurement, for a predetermined non-integrity probability $P_{ni}$, is an upper bound on the deviation between the calculated value and the real value of the measured quantity, such that there is a probability of less than $P_{ni}$ that the real value is a distance greater than RP away from the calculated value, without triggering an alarm towards a navigation system. Stated otherwise, there is therefore a maximum probability $P_{ni}$ that the real value is outside of a circle of radius RP around the value that was measured or else that there is a maximum probability $P_{ni}$ of being mistaken in the determination of the protection radius.

This protection radius is calculated on the basis of the standard deviations of the variables considered. It applies to each component of the state vector, but in practice, the position variables are of interest. It is possible more specifically to calculate a vertical protection radius for the altitude and a horizontal protection radius for the position in terms of longitude and latitude, these radii not necessarily having the same value and not being used in the same manner.

The principle of the calculation of the horizontal protection radius is presented in what follows:

The protection radius is in general a datum which is calculated and then compared with a threshold HAL fixed as a function of the application, the exceeding of the threshold generates an alert indicating either that the position measurement cannot be considered to be sufficiently reliable or available in the context of the application.

Advantageously, when the calculation module, CAL identifies the satellite of index i as having failed, the secondary filter $KSF_i$ is substituted for the hybridization filter MKF.

The protection radius $RP_{H0}$ is evaluated in the absence of any satellite fault, an hypothesis commonly denoted $H_0$. The term "fault" is understood to mean an abnormal situation where the satellite transmits signals which have the appearance of normal signals but which are abnormal and lead to position errors.

The protection radius $RP_{H0}$ is linked directly to the variance of the measured quantity and to the probability $P_{ni}$ that this error exceeds the protection radius. The variance is the square of the standard deviation $\sigma$ linked to the measured quantity. The variance of the measured position is therefore the coefficient of the diagonal of the variance/covariance matrix P which corresponds to the measured quantity. The standard deviation $\sigma$ is the square root of this variance and is therefore deduced from the matrix P of the hybridization filter.

In the hybrid system according to the prior art, the protection radius $RP_{H0}$ is calculated on the basis of the coefficients of the variance/covariance matrix P such as they appear at the measurement instant. If the configuration of the satellites evolves, the value of the protection radius $RP_{H0}$ is updated at the same time. If a satellite disappears from the visible constellation, the protection radius $RP_{H0}$ degrades only progressively. If conversely a new satellite appears, the protection radius decreases instantaneously, this being very advantageous.

It is also possible to calculate a protection radius $RP_{H1}$ taking into account the risk of a satellite fault, an hypothesis commonly denoted $H_1$. For this purpose the receiver uses the procedure well known by the name "maximum separation": In this case, the receiver comprises a Kalman hybridization filter MKF which operates as has been previously described and N secondary filters, if N is the number of satellites that may be seen at the same time. The N secondary filters operate in parallel with the Kalman hybridization filter MKF and in accordance with the same principle as the latter. But the secondary filter of rank i receives the signals of all the satellites except that originating from the satellite of rank i.

Figure 2:
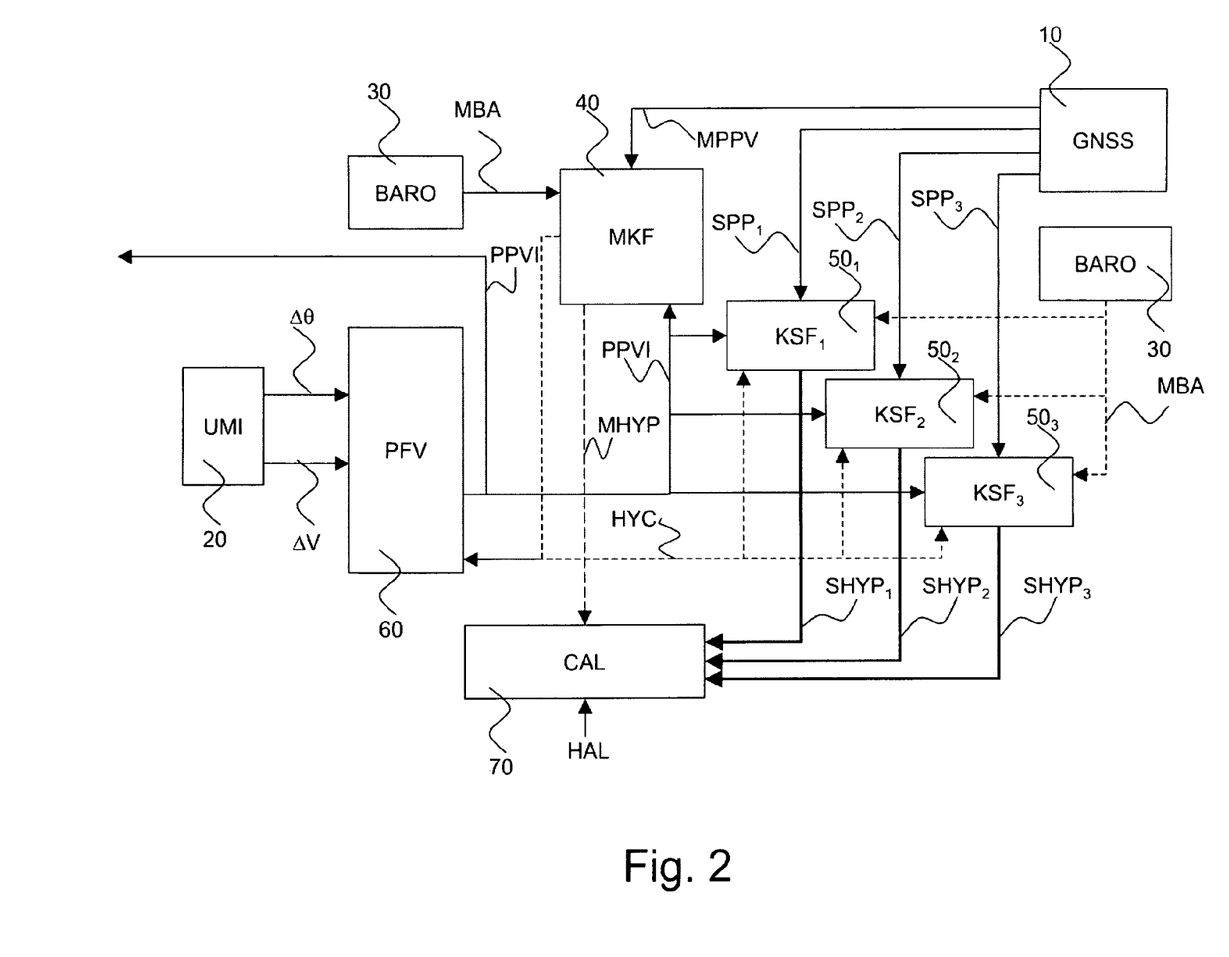
FIG. 2 schematically represents a hybrid system, closed loop and tight hybridization, according to the invention.

FIG. 2 represents a hybrid system with closed loop and tight hybridization, according to the invention.

A first difference with the hybrid system of the prior art relates to the consideration of the barometric measurements MBA by the hybrid system and the fact that the system's hybrid output is equal to the inertial positions PPVI delivered by the virtual platform, PFV.

According to the invention, the barometric measurements MBA are received by the hybridization filter and by the secondary filters $KSF_i$.

Thus, a slaving of the position along a vertical is carried out directly by the Kalman filter: there is no need to develop a slaving independent of the Kalman filter as is the case in the prior art.

A second difference with the hybrid system of the prior art relates to the production by the hybridization filter MKF of a hybrid correction HYC which comprises an estimation of the state vector VE. The hybrid correction HYC is delivered on the one hand to the virtual platform, and on the other hand to the secondary filters $SKF_i$. Hence, the inertial positioning and speed data PPVI produced by the platform PFV constitute, directly, the hybrid position and the hybrid speed, and hence the value of the components of the state vectors EV and $EVE_i$ are close to zero.

A third difference relates to the method of calculation of the protection radius by the calculation module CAL. The principle of the calculation is based on evaluating a confidence ellipse.

Figure 3:
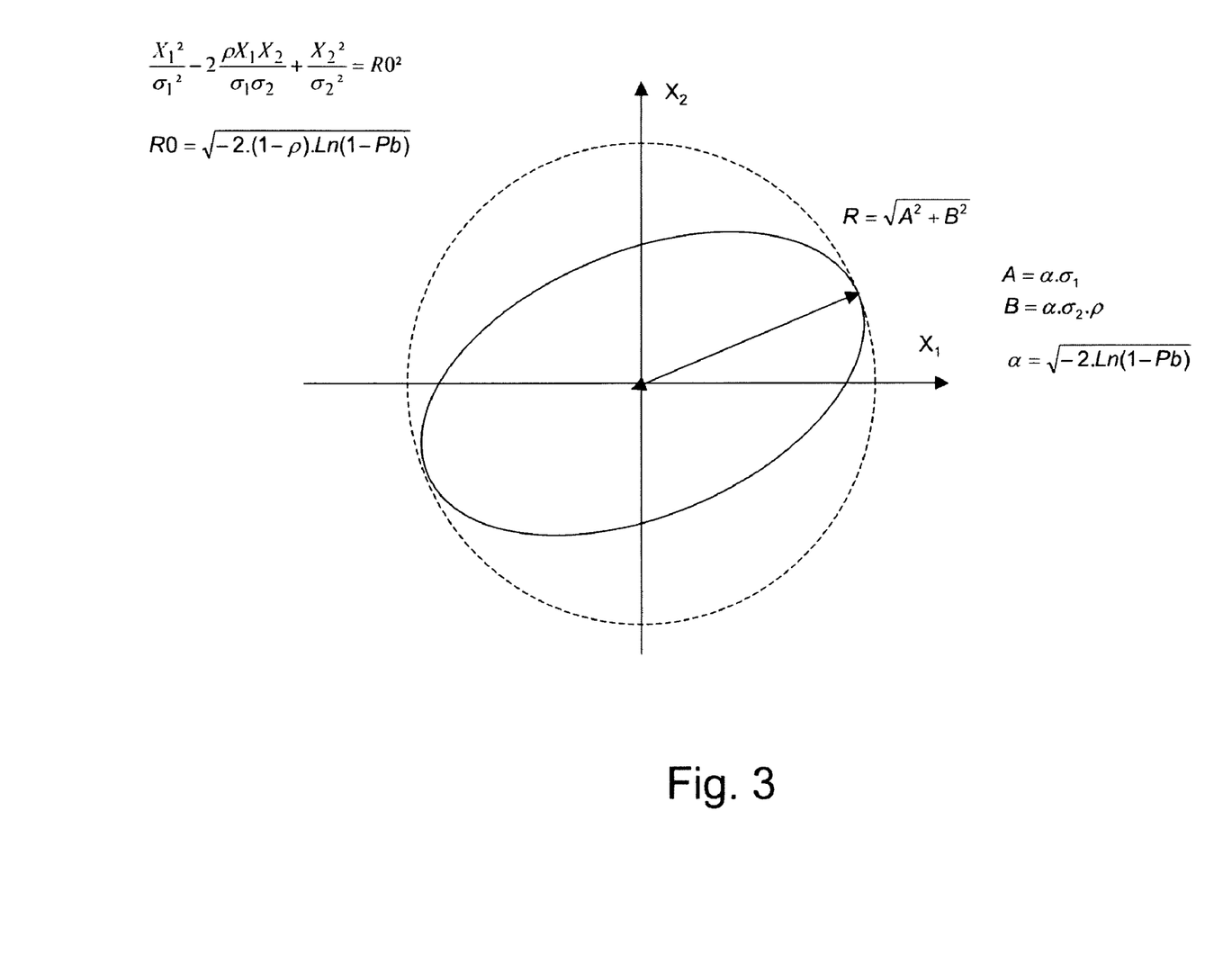
FIG. 3 represents a confidence ellipse and a circle enveloping the ellipse, the radius of the circle is employed in the method for monitoring the integrity of information according to the invention.

Let us consider X1 and X2 two Gaussian variables with zero mean and respective standard deviation $\sigma_1$ and $\sigma_2$ and correlation coefficient $\rho$. For example, X1 and X2 correspond to position errors expressed as latitude and longitude. A domain of the plane X1, X2 corresponding to a constant value of joint probability density of X1 and X2 and equal to R0 is an ellipse with equation:

$$\frac{X_1^2}{\sigma_1^2} - 2\frac{\rho X_1 X_2}{\sigma_1 \sigma_2} + \frac{X_2^2}{\sigma_2^2} = R0^2$$

If it is desired that the area of the ellipse correspond to a probability Pb that is to say it is desired to obtain a probability Pb that the position error is inside the ellipse, it is necessary to impose the relation:

$$R0 = \sqrt{-2 \cdot (1-\rho) \cdot Ln(1-Pb)}$$

When X1 and X2 correspond to determined horizontal position errors, for example through hybridization of measurements of signals produced by a constellation of satellites and the data of an inertial reference system, a confidence ellipse is fully defined as soon as a sought-after probability value Pb is fixed and as soon as a variance/covariance matrix of dimension 2*2 associated with X1 and X2 is known. Indeed, if P is a variance/covariance matrix linking these two variables, $\sigma_1$ and $\sigma_2$ are the diagonal coefficients of the matrix and $\rho$ is equal to its non-diagonal coefficient.

FIG. 3 represents a confidence ellipse employed in the method for calculating the protection radius.

A circle of radius R such that $R^2 = A^2 + B^2$ defines an envelope of the confidence ellipse on condition that:

$$A = \alpha \cdot \sigma_1$$

$$B = \alpha \cdot \sigma_2 \cdot \rho$$

$$\alpha = \sqrt{-2 \cdot Ln(1-Pb)}$$

It is therefore possible to determine a R protection radius value for two variables, for example hybrid positions, on the basis of the above deterministic expressions as soon as the sought-after probability values Pb and the variance/covariance matrix of dimension 2×2 corresponding to these variables are known.

Advantageously, the determination of the auxiliary horizontal protection radius $RP_{H1}$ is based on a desired false alarm probability value $\tau_1$ and on a desired missed detection probability value $\tau_2$.

Advantageously, the determination of the auxiliary horizontal protection radius $RP_{H0}$ is based on a desired missed detection probability value $\tau_2$ and on a value of probability of occurrence of an undetected satellite defect $\tau_3$.

Advantageously, the variance/covariance matrix PEi, of dimension 2×2, used for determining the auxiliary horizontal protection radius $RP_{H1}$ is extracted from an auxiliary matrix $PS_i$=Pi−MHYP, the axes extracted from the matrix $PS_i$ corresponding to the horizontal position. Then the determination of the auxiliary horizontal protection radius $RP_{H1}$ under the hypothesis $H_1$, comprises the steps of:

Determining P01=1−$\tau_1$/N;

Determining a test threshold value $TH_i$ based on the value P01 and on the matrix PEi;

Determining $P02=1-\tau_2$;

Determining a value of auxiliary protection radius $d_i$ as equal to the radius of the circle enveloping an ellipse determined on the basis of the matrix PEi and of the probability P02;

Determining the radius value $RP_{H1}$ as a maximum value of $(TH_i+d_i)$, for all the values of i between 1 and N.

Advantageously, a variance/covariance matrix P of dimension 2×2 used for determining the auxiliary horizontal protection radius $RP_{H0}$ is extracted from the variance/covariance matrix MHYP, the axes extracted from the matrix MHYP corresponding to the horizontal positions. Then the determination of the auxiliary horizontal protection radius $RP_{H0}$ under the hypothesis $H_0$, comprises the steps of:

Determining $P03=1-\tau_2 \cdot \tau_3$;

Determining the radius value $RP_{H0}$ as equal to the radius of the circle enveloping an ellipse determined on the basis of the matrix P and of the probability P03.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A INS/GNSS hybrid system with integrity monitoring, comprising:

a barometric module BARO delivering measurements of barometric altitude MBA;

an inertial measurement unit UMI delivering angle increments $\Delta\theta$ and speed increments $\Delta V$;

a virtual platform PFV receiving the angle increments $\Delta\theta$, the speed increments $\Delta V$ and producing inertial positioning and speed data PPVI constituting respectively a hybrid position and a hybrid speed;

a satellite-based positioning receiver GNSS operating on the basis of a constellation of N tracked visible satellites, and producing raw measurements, $MB_i$ of the signals transmitted by these satellites, i denoting a satellite index and lying between 1 and N;

a Kalman hybridization filter MKF receiving the inertial positioning and speed data PPVI, the measurements of barometric altitude MBA, and the raw measurements $MB_i$ of the signals transmitted by the N satellites, said filter delivering:

a hybrid correction HYC comprising an estimation of a state vector VE corresponding to the errors of the hybrid system and obtained by observing the deviations between the inertial positioning and speed data PPVI and the raw measurements $MB_i$, and a variance/covariance matrix MHYP of the error made in the estimation of the state vector VE;

a bank of N secondary filters $KSF_i$ each receiving the inertial positioning and speed PPVI, the measurements of barometric altitude MBA, and the raw measurements $MB_i$ of the signals transmitted by the tracked satellites except the satellite of index i, said secondary filters $KSF_i$ delivering hybrid parameters $SHYP_i$ comprising an estimation of a state vector $EVE_i$ corresponding to the errors of the hybrid system, calculated by observing deviations between the inertial positioning and speed data PPVI and the raw measurements of the signals transmitted by the tracked satellites except the satellite i $SPP_i$, and a secondary variance/covariance matrix $P_i$ of the error made in the estimation of the state vector $EVE_i$;

a calculation module CAL receiving the hybrid parameters $SHYP_i$ and the variance/covariance matrix, MHYP, said calculation module CAL determining a horizontal protection radius $R_T$ associated with the hybrid position, and, when components of the estimation of the state vector $EVE_i$ relating to the position are greater than a detection threshold $TH_i$, triggering an alarm upon a failure of a secondary filter $KSF_i$, and optionally identifying a failed satellite from among the N tracked visible satellites, wherein the secondary filters $KSF_i$ and the virtual platform PFV furthermore receive the hybrid correction HYC.

2. The system as claimed in claim 1, wherein, when the calculation module CAL identifies the satellite of index i as having failed, the secondary filter $KSF_i$ is substituted for the Kalman filter MKF.

3. A method for determining a horizontal protection radius $RP_T$ for monitoring integrity of hybrid positions delivered by a virtual platform PFV of a hybrid system as claimed in claim 1, said method implemented by the calculation module CAL of the hybrid comprising the steps of:

determining an auxiliary horizontal protection radius $RP_{H1}$, under an hypothesis termed $H_1$, that one of the raw measurements, $MB_i$ is erroneous, determining an auxiliary horizontal protection radius $RP_{H0}$, under an hypothesis termed $H_0$, that none of the raw measurements, $MB_i$ is erroneous;

fixing the value of the horizontal protection radius $RP_T$ as a maximum of the horizontal auxiliary protection radii $RP_{H0}$ and $RP_{H1}$, wherein the determination of the auxiliary horizontal protection radii $RP_{H0}$ and $RP_{H1}$ is based on determining a radius of a circle enveloping a confidence ellipse in a horizontal plane, and in that the confidence ellipse is determined on the basis of a variance/covariance matrix and of a sought-after probability value.

4. The method as claimed in claim 3, wherein the determination of the auxiliary horizontal protection radius $RP_{H1}$ is based on a desired false alarm probability value $\tau_1$ and on a desired missed detection probability value $\tau_2$.

5. The method as claimed in claim 3, wherein the determination of the auxiliary horizontal protection radius $RP_{H0}$ is based on a desired missed detection probability value $\tau_2$ and on a value of probability of occurrence of an undetected satellite defect $\tau_3$.

6. The method as claimed in claim 4, wherein a variance/covariance matrix PEi, of dimension 2×2, is extracted from an auxiliary matrix $PS_i$=Pi−MHYP with axes corresponding to the horizontal positions, and wherein the determination of the auxiliary horizontal protection radius $RP_{H1}$ under the hypothesis $H_1$, comprises the steps of:

Determining $P01=1-\Sigma_1/N$;

Determining a test threshold value $TH_i$ based on the value P01 and on the matrix PEi;

Determining $P02=1-\tau_2$;

Determining a value of auxiliary protection radius $d_i$ as equal to the radius of the circle enveloping an ellipse determined on the basis of the matrix PEi and of the probability P02;

Determining the radius value $RP_{H0}$ as a maximum value of $(TH_i+d_i)$, for all the values of i between 1 and N.

7. The method as claimed in claim 5, wherein a variance/covariance matrix P of dimension 2×2 being extracted from the variance/covariance matrix MHYP with axes corresponding to the horizontal positions, and wherein the determination of the auxiliary horizontal protection radius $RP_{H0}$ under the hypothesis $H_0$, comprises the steps of:

determining $P03 = 1 - \tau_2 \cdot \tau_3$;

determining the radius value $RP_{H0}$ as equal to the radius of the circle enveloping an ellipse determined on the basis of the matrix P and of the probability P03.

* * * * *